US011431229B2

(12) United States Patent
Schroth et al.

(10) Patent No.: US 11,431,229 B2
(45) Date of Patent: Aug. 30, 2022

(54) DEVICE FOR REDUCING HARMFUL BEARING VOLTAGES

(71) Applicant: ebm-papst Mulfingen GmbH & Co. KG, Mulfingen (DE)

(72) Inventors: Sebastian Schroth, Kupferzell (DE); Manuel Walter, Schwäbisch Hall (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 164 days.

(21) Appl. No.: 16/782,210

(22) Filed: Feb. 5, 2020

(65) Prior Publication Data

US 2020/0177048 A1    Jun. 4, 2020

Related U.S. Application Data

(63) Continuation of application No. PCT/EP2018/071296, filed on Aug. 6, 2018.

(30) Foreign Application Priority Data

Aug. 9, 2017 (DE) .................... 10 2017 118 125.3

(51) Int. Cl.
*H02K 11/40* (2016.01)
*H02K 11/01* (2016.01)
(Continued)

(52) U.S. Cl.
CPC .......... *H02K 11/0141* (2020.08); *F16C 19/08* (2013.01); *H02K 5/1732* (2013.01); *H02K 11/40* (2016.01)

(58) Field of Classification Search
CPC ............ H02K 5/00; H02K 5/17; H02K 5/173; H02K 5/1732; H02K 5/1737; H02K 7/00;
(Continued)

(56) References Cited

U.S. PATENT DOCUMENTS 5,661,353 A       8/1997   Erdman et al.
2010/0253158 A1*  10/2010  Mizukami .............. H02K 11/02
                                                   310/43
(Continued)

FOREIGN PATENT DOCUMENTS

DE          199 48 145 C1    6/2001
DE    10 2004 016 738 B3    11/2005
(Continued)

OTHER PUBLICATIONS

Schroth, Sebastian et al., Impact of Stator Grounding in Low Power Single-Phase EC-Motors, 2014 IEEE Applied Power Electronics Conference and Exposition—APEC 2014, IEEE, Mar. 16, 2014, pp. 783-790.

(Continued)

*Primary Examiner* — Tran N Nguyen
(74) *Attorney, Agent, or Firm* — Harness, Dickey & Pierce, P.L.C.

(57) ABSTRACT

A device (1) to reduce harmful bearing voltages in an electrical machine (M) fed by a DC link voltage of a DC link. The electrical machine has a rotor (2) and a stator (3) with windings (W), and is insulated to ground. At least two bearings (4), with an outer bearing ring (4a) and an inner bearing ring (4i), are between the rotor (2) and the stator (3). A shielding arrangement (S) is between the windings (W) of the stator (2) and the respective outer bearing rings (4a). A stator electrical connecting arrangement (5) is connected to a potential that is stable with respect to the DC link.

14 Claims, 2 Drawing Sheets

(51) Int. Cl.
*F16C 19/08* (2006.01)
*H02K 5/173* (2006.01)

(58) Field of Classification Search
CPC .......... H02K 7/08; H02K 7/086; H02K 11/00; H02K 11/40; F16C 19/00; F16C 19/06; F16C 19/08; F16C 19/52; F16C 19/54
See application file for complete search history.

(56) References Cited

U.S. PATENT DOCUMENTS

| | | | |
|---|---|---|---|
| 2011/0234026 A1* | 9/2011 | Mizukami | H02K 11/40 310/43 |
| 2013/0119806 A1 | 5/2013 | Watanabe et al. | |
| 2015/0349588 A1 | 12/2015 | Tokoi et al. | |
| 2017/0346360 A1* | 11/2017 | Heidler | H02K 3/42 |

FOREIGN PATENT DOCUMENTS

| | | | | |
|---|---|---|---|---|
| DE | 20 2015 103 902 U1 | | 8/2015 | |
| DE | 102014018338 | * | 6/2016 | ............... H02K 3/42 |
| DE | 10 2015 112 146 A1 | | 1/2017 | |
| EP | 1 445 850 A1 | | 8/2004 | |
| EP | 3 148 056 A1 | | 3/2017 | |
| WO | WO-2016/091360 | | 6/2016 | |

OTHER PUBLICATIONS

International Search Report and Written Opinion (in German) dated Oct. 24, 2018 in corresponding PCT/EP2018/071296.

German Search Report (in German) dated Feb. 27, 2018 in corresponding German Application No. 10 2017 118 125.3.

* cited by examiner

DEVICE FOR REDUCING HARMFUL BEARING VOLTAGES

CROSS-REFERENCE TO RELATED APPLICATIONS

This application is a continuation of International Application No. PCT/EP2018/071296, filed Aug. 6, 2018, which claims priority to German Application No. 10 2017 118 125.3, filed Aug. 9, 2017. The disclosures of the above applications are incorporating herein by reference.

FIELD

The present disclosure relates to a device to reduce undesirable bearing voltages in an electrical machine, such as an EC motor.

BACKGROUND

Variable-speed motors are nowadays typically fed by intermediate circuit voltage converters. Feeding by an intermediate circuit voltage converter, however, can result in undesirable bearing voltages. This may cause harmful bearing currents in the bearings of the motor. Such a current flow through the bearings can cause damages, up to total failure, in electrical machines having rolling and sliding bearings.

As a remedy, current-insulated or electrically insulating bearings, e.g. bearings with a ceramic insulation on the outer ring or hybrid bearings with ceramic rolling bodies, were used in the past. These bearings are very expensive. Thus, this solution is not suitable for mass production.

Other remedial action is known from the prior art. For example, documents EP 1 445 850 A1 or DE 10 2004 016 738 B3 disclose a device to protect electrical machine bearings. It provides a compensation arrangement or compensation device to generate a compensation current to compensate for an interference current through the bearings.

Feeding an electrical machine from a pulse-controlled inverter generates a capacitively coupled bearing voltage. The switched pulse pattern of the inverter results in a common mode voltage (CMV) with respect to ground at the inverter output. The voltage leaps with the switching frequency of the inverter.

Document DE 20 2015 103902 U deals with the resulting issues. Here, a voltage is formed between the inner and outer bearing rings and the balls of the bearing that run on an insulating oil film. If an insulation breakdown occurs, due to insufficient insulating thickness of the oil film or high bearing voltages, the oil film capacitance and other parallel parasitic capacitances discharge of the overall structure discharge. The charge carriers between the inner and outer rings of the bearing perform charge balancing (electric discharge machining) that can result in bearing damage.

Document DE 20 2015 103902 U proposes to introduce a capacitance while at the same time insulate the stator. The stator is selected significantly larger than the parasitically generated capacitors in the remaining network. As a result of this action, the stator is connected to ground (GND) in the relevant frequency range. Preferably, it is connected to the ground potential of the inverter. A connection between the stable electronic potential and ground conductor or earth is predominantly made by the Y capacitors installed in the EMC filter. The connection can almost be considered a short circuit due to the large capacitances of the EMC filter for frequency ranges where bearing voltages are caused by PWM docking. Voltage can build up via the other capacitances, both on the outer bearing ring and on the rotor or the inner bearing ring conductively connected thereto. Thus, the solution of DE 20 2015 103902 U actually eliminates just a part of the problem.

If such voltages are present, between the outer bearing ring and the inner bearing ring or the rotor conductively connected thereto, the voltages are greater than the dielectric strength of the lubricating film between bearing race and ball. Thus, breakdown will occur and the bearing races are roughened.

SUMMARY

It is the object of the disclosure to overcome the above mentioned problems. A solution is provided where the undesirable bearing voltages and the resulting bearing currents can be effectively reduced or eliminated altogether.

This object is achieved by a device having the features of a device for reducing bearing voltages in an electrical machine (M) fed by a DC link voltage of a DC link. A stator, with windings, is isolated from ground. A rotor with at least two bearings include an outer bearing ring and an inner bearing ring. The bearings are between the rotor and the stator. A shielding arrangement is at least provided between the windings of the stator and the respective outer bearing rings. An electrical connecting arrangement of the stator to a potential is stable with respect to the DC link. The connecting arrangement of the stator to the potential, stable with respect to the DC link, is established via an impedance or a capacitance. The shielding arrangement is connected to the stator directly or indirectly via an impedance or a capacitance via an electrical connecting arrangement.

The disclosure is based on the concept that a combination of a shielding and specific adjustment of the capacitance network of an electrical machine or motor can reduce the potentials of the outer and inner bearing rings.

One step includes connecting one shield and the motor stator via impedance or capacitance to a stable potential with respect to the DC link of the electronics. The shield is introduced around the windings of the stator. It reduces the capacitive couplings between the windings, the outer bearing ring, and the stator, as well as the rotor.

The shield and the stator are connected to a stable potential, preferably to ground. Thus, the return currents to electronics close and no undesirable leakage current, via the bearings, is generated. Furthermore, the shield also reduces the bearing voltage.

According to the disclosure, the shield is configured in the motor. The shield significantly reduces the capacitive couplings between the winding and the respective outer bearing ring. Also, it reduces capactive coupling both on the stator and on the rotor sides, as well as the capacitive coupling between the windings and the rotor. The result is that the capacitive feed of common mode voltages is reduced between the windings and the outer bearing rings as well as between the windings and the rotor.

According to the disclosure, a device is proposed for reducing bearing voltages in an electrical machine fed by a DC link voltage of a DC link. The electrical machine comprises a stator with windings, and a rotor. At least two bearings, with an outer bearing ring and an inner bearing ring, are provided between the rotor and the stator. The device includes a shielding arrangement. The shielding arrangement is at least provided between the windings of the stator and the respective outer bearing rings. An electrical connecting arrangement is provided between the stator to a potential that is stable with respect to the DC link.

In a preferred embodiment of the disclosure, the connecting arrangement of the stator is connected to a potential that is stable with respect to the DC link via an impedance or a capacitance. In a particularly preferred embodiment of the disclosure, the stable potential is the ground reference potential (GND) of the commutation electronics or the inverter.

It is further advantageous that the shielding arrangement is connected to the stator directly or in directly, via an impedance or a capacitance, via an electrical connecting arrangement.

In another embodiment of the disclosure, the shielding arrangement is connected to the ground potential (PE). This slightly deteriorates its EMC but all in all results in a reduction of the bearing voltage. For this, however, it is required that the stator is connected to a stable electronic potential, preferably to ground.

In an advantageous embodiment of the disclosure, the shielding arrangement is electrically connected via a connecting arrangement to a potential that is stable with respect to the ground potential (PE) or to the same stable potential as the stator. If the stator is connected to ground and the bearing shield is connected to the grounded stator, a major portion of the interferences flows to the electronics and not back to ground. Thus, on one hand, the bearing voltage is reduced, and on the other hand EMC is improved. Another advantage of this solution is that the shielding arrangement does not need to be contacted to the electronics.

In a similarly advantageous embodiment of the device, the connecting arrangement of the shielding arrangement is connected to a stable electronic potential with respect to ground via a capacitance/impedance. In this case, the stator connection can be removed. The stator must not necessarily be grounded or connected to a potential that is stable with respect to ground.

The shielding arrangement is preferably configured so that the capacitive couplings between winding and outer bearing ring and the coupling between the winding and rotor are significantly reduced. Thus, the shielding arrangement comprises at least one shielding section that covers the winding head or the respective windings. It is further advantageous that the shielding arrangement has shielding sections between the outer bearing ring and the windings. Preferably, they are inserted into respective bearing pockets.

Furthermore, it is an advantage that the shielding arrangement also has a number of shielding sections to shield between the grooves. Preferably, there are as many as the number of grooves on the rotor. These shielding sections may extend as webs from a top section covering the winding head to a respective bottom shielding section along the grooves. An electrically separating connection must be present between webs to suppress eddy current effects due to the rotating magnetic field if more than one groove web is used.

Other advantageous further developments of the disclosure are characterized in the dependent claims or are explained in more detail below with reference to the figures and together with a preferred embodiment of the disclosure.

DRAWINGS

Further features and advantages of the disclosure result from the following description of exemplary embodiments with reference to the appended drawings. The following is shown:

DETAILED DESCRIPTION

The disclosure is described in more detail below based on preferred exemplary embodiments and with reference to FIGS. 1 to 4. The same reference symbols indicate the same functional and/or structural features.

Figure 1:
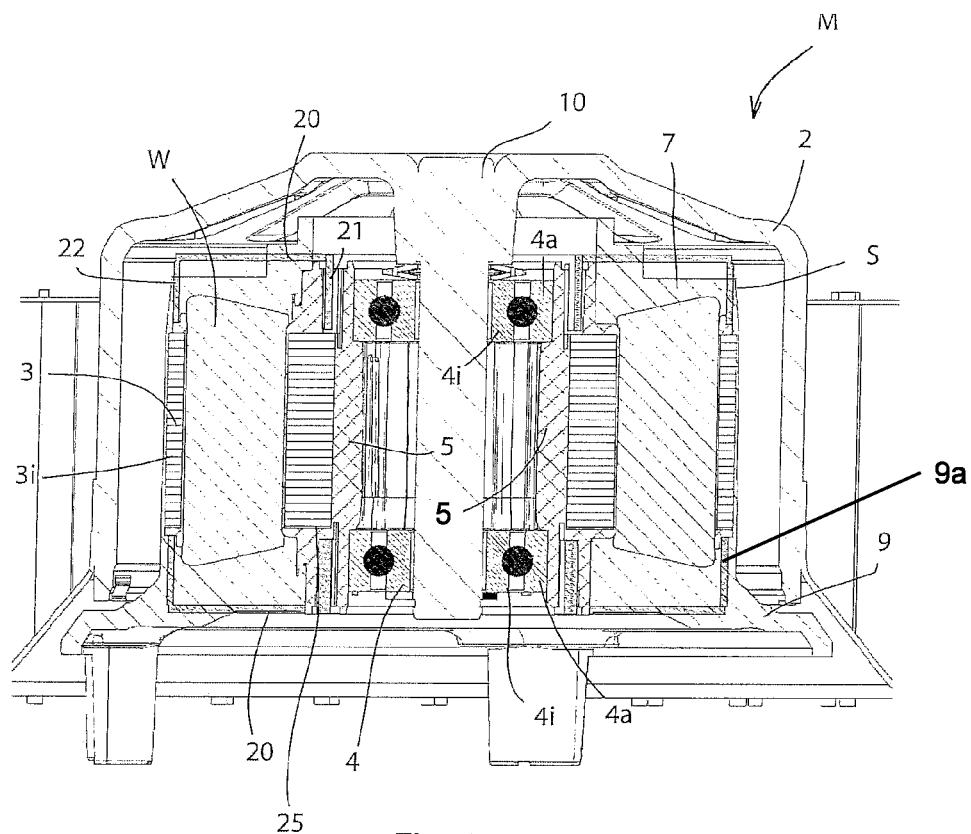
FIG. 1 is a section view through a motor according to a first embodiment.

FIG. 1 illustrates a section view through an electric motor M with a device for reducing bearing voltages at the bearings 4. It has an outer bearing ring 4a and an inner bearing ring 4i according to an exemplary embodiment.

The motor M has a rotor 2 and a stator 3. The stator is formed of stator panels 3i. A rotor-side and a stator-side outer bearing ring 4a and inner bearing ring 4i are provided, respectively, between the rotor 2 and the stator 3. Further shown are the shaft 10 and the windings W of the motor M. An insulating casting compound 9 is applied around the windings W and an insulating encapsulation 9a is applied along the stator panels 3i.

If a common mode voltage $U_{CM}$ is applied to the windings W, a bearing potential with respect to the ground potential PE is generated at each of the bearings 4 due to the capacitive coupling to the winding W. The potential is reduced by the action described below.

Figure 2:
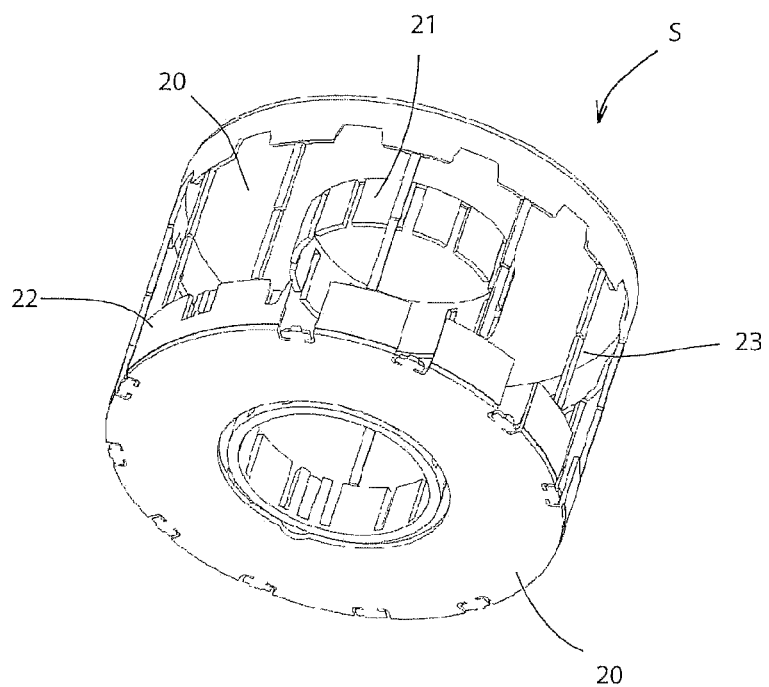
FIG. 2 is a perspective view of an embodiment of a shielding arrangement.

The device shown in FIG. 1, for reducing bearing voltages, includes a shielding arrangement S. A perspective view is shown in FIG. 2. The shielding arrangement S is provided between the windings W of the stator 3 and the respective outer bearing rings 4a.

As is visible in FIGS. 1 and 2, the shielding arrangement S has a shielding section 20 at its top and bottom. The shielding section 20 covers the winding head 7 of the windings W. The shielding arrangement S has a substantially cylindrical envelope. The envelope includes the shielding sections 20, mentioned above, and the other shielding sections 21. The sections 21 are between the outer bearing ring 4a and the windings W. They are disposed in bearing pockets in the assembled state of the shielding arrangement S. Furthermore, the shielding arrangement S includes multiple shielding sections 23. Sections 23 are attached peripherally at groove distance. They shield in the usable slots between the panel packs 3i of the stator 3.

Figure 3:
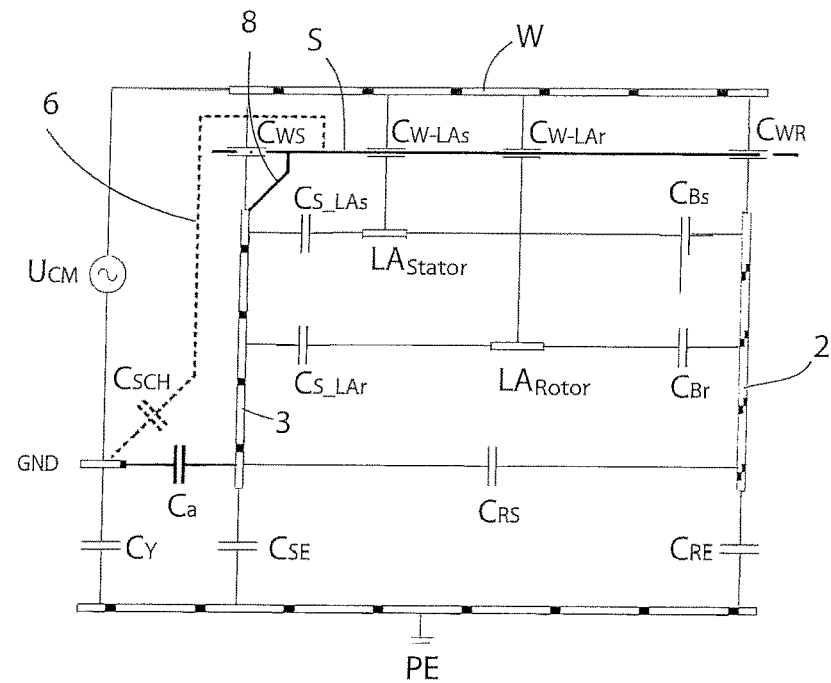
FIG. 3 is a schematic of an equivalent circuit diagram of the capacitance network for a first embodiment.
Figure 4:
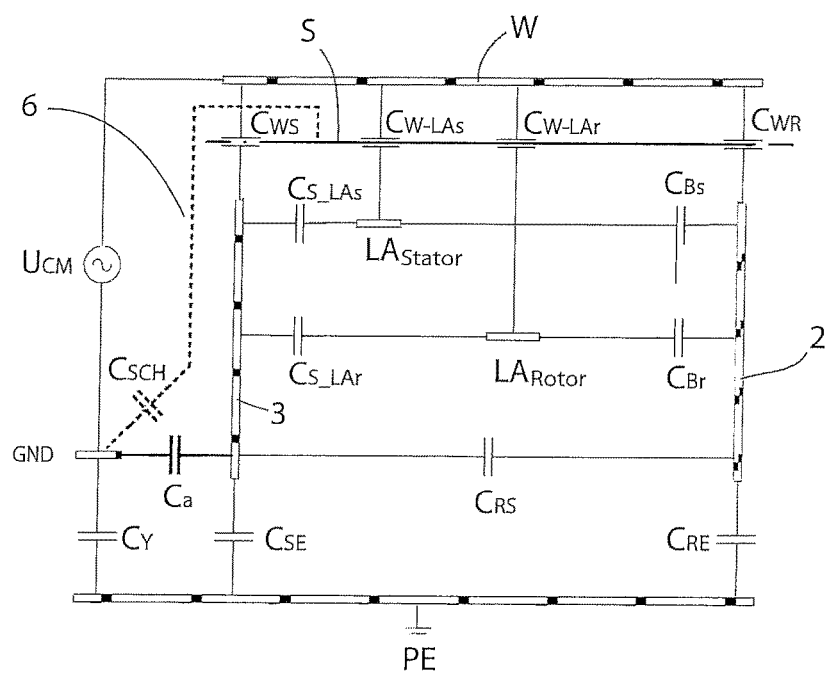
FIG. 4 is a schematic of an equivalent circuit diagram of the capacitance network for an alternative embodiment.

FIGS. 3 and 4 show equivalent circuit diagrams of exemplary embodiments. The respective equivalent circuit diagram represents the capacitance network for the respective embodiments with the system-related capacitances $C_{WS}$, $C_{W\text{-}LAS}$, $C_W\text{-}LA_R$, $C_{WR}$, $C_{BS}$, $C_{BR}$, $C_{RS}$, $C_{RE}$, $C_{SE}$, $C_Y$, $C_{S\text{-}LAS}$, $C_S\text{-}iAr$, each representing exemplary capacitances between W=winding, LA=outer bearing ring (r=rotor-side, s=stator-side), r=rotor, s=stator, and other capacitances between the respective components of the motor, which will not be explained in detail herein. Furthermore, the potential PE of protective ground is shown in the network. Also, the ground reference potential GND and the common mode voltage $U_{CM}$ are shown.

According to the disclosure, a connecting arrangement 5 of the stator 3 to a potential that is stable with respect to the DC link can be established via an impedance or a capacitance $C_a$. This is shown in both embodiments according to FIGS. 3 and 4.

The stable potential herein is the ground reference potential GND of the inverter. The shielding arrangement S is directly connected to the stator 3, via an electrical connecting arrangement 8.

In the embodiment according to FIG. 4, the shielding arrangement S is electrically connected, via a connecting arrangement 6, to a potential that is stable with respect to the ground potential (PE). This is the same potential that the stator 3 is connected, i.e. the ground reference potential GND. The connection of the shielding arrangement S to the ground reference potential GND is made via a capacitance $C_{SCH}$. The capacitance $C_{SCH}$ may optionally be included in FIG. 3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A device for reducing bearing voltages in an electrical machine (M) fed by a DC link voltage of a DC link, comprising:
    a stator with windings isolated from a ground reference potential;
    a rotor;
    at least two bearings including an outer bearing ring and an inner bearing ring, the bearings are between the rotor and the stator;
    a shielding arrangement is at least provided between the windings of the stator and the respective outer bearing rings;
    a first electrical connecting arrangement that connects the stator to a stable potential that is stable with respect to the DC link; and
    the first electrical connecting arrangement that connects the stator to the stable potential that is stable with respect to the DC link being established via a first impedance or a first capacitance, the shielding arrangement being connected to the stator directly or indirectly via a second impedance or a second capacitance via a second electrical connecting arrangement,
    wherein the shielding arrangement is electrically connected via a third electrical connecting arrangement to a potential that is stable with respect to the ground reference potential or to the same stable potential as the stator.

2. The device according to claim 1, wherein the stable potential is the ground reference potential of commuting electronics or of an inverter.

3. The device according to claim 2, wherein the shielding arrangement is connected to the ground reference potential.

4. The device according to claim 1, wherein the third electrical connecting arrangement of the shielding arrangement to the potential is established via an impedance or capacitance.

5. The device according to claim 1, wherein the shielding arrangement further comprises a shielding section covering a winding head of the windings.

6. The device according to claim 1, wherein the shielding arrangement further comprises shielding sections between the outer bearing ring and the windings.

7. The device according to claim 1, where the shielding arrangement further comprises a number of shielding sections for shielding between grooves of the rotor.

8. The device according to claim 7 wherein the number of shielding sections is as many as the number of grooves of the rotor.

9. A device for reducing bearing voltages in an electrical machine (M) fed by a DC link voltage of a DC link, comprising:
    a stator with windings isolated from a ground reference potential;
    a rotor;
    at least two bearings including an outer bearing ring and an inner bearing ring, the bearings are between the rotor and the stator;
    a shielding arrangement is at least provided between the windings of the stator and the respective outer bearing rings,
    wherein the shielding arrangement comprises a number of shielding sections for shielding between grooves of the rotor;
    a first electrical connecting arrangement that connects the stator to a stable potential that is stable with respect to the DC link; and
    the first electrical connecting arrangement that connects the stator to the stable potential that is stable with respect to the DC link being established via a first impedance or a first capacitance, the shielding arrangement being connected to the stator directly or indirectly via a second impedance or a second capacitance via a second electrical connecting arrangement.

10. The device according to claim 9, wherein the stable potential is the ground reference potential of commuting electronics or of an inverter.

11. The device according to claim 10, wherein the shielding arrangement is connected to the ground reference potential.

12. The device according to claim 10, wherein the shielding arrangement further comprises a shielding section covering a winding head of the windings.

13. The device according to claim 10, wherein the shielding arrangement further comprises shielding sections between the outer bearing ring and the windings.

14. The device according to claim 10 wherein the number of shielding sections is as many as the number of grooves of the rotor.

* * * * *